US008111327B2

(12) United States Patent
Shih et al.

(10) Patent No.: US 8,111,327 B2
(45) Date of Patent: Feb. 7, 2012

(54) METHOD AND APPARATUS FOR AUDIO/VIDEO SYNCHRONIZATION

(75) Inventors: Hung-Cheng Shih, Taoyuan County (TW); De-Hui Shiue, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1290 days.

(21) Appl. No.: 11/754,304

(22) Filed: May 27, 2007

(65) Prior Publication Data

US 2008/0152309 A1    Jun. 26, 2008

(30) Foreign Application Priority Data

Dec. 20, 2006    (TW) .............................. 95147910 A (51) Int. Cl.
*H04N 9/475* (2006.01)
*H04N 7/00* (2006.01)
*H04B 1/66* (2006.01)
(52) U.S. Cl. .... 348/515; 348/475; 375/240; 375/240.28
(58) Field of Classification Search ........................ None
See application file for complete search history.

(56) References Cited

U.S. PATENT DOCUMENTS

| 5,351,092 | A | | 9/1994 | Poimboeuf et al. |
| 5,617,502 | A | | 4/1997 | Ort et al. |
| 6,016,166 | A | * | 1/2000 | Huang et al. .................. 348/515 |
| 6,130,987 | A | | 10/2000 | Tanaka |
| 6,181,383 | B1 | * | 1/2001 | Fox et al. ...................... 348/515 |
| 6,452,974 | B1 | * | 9/2002 | Menon et al. ............. 375/240.28 |
| 6,510,279 | B1 | | 1/2003 | Morishita |
| 6,744,815 | B1 | * | 6/2004 | Sackstein et al. ............. 375/240 |
| 7,054,544 | B1 | | 5/2006 | Tanaka |
| 2005/0019020 | A1 | | 1/2005 | Sato et al. |
| 2006/0290810 | A1 | * | 12/2006 | Mallinson ..................... 348/515 |

OTHER PUBLICATIONS

"Office Action of Taiwan Counterpart Application", issued on May 31, 2010, p. 1-p. 5.

* cited by examiner

*Primary Examiner* — Jefferey Harold
*Assistant Examiner* — Sean Haiem
(74) *Attorney, Agent, or Firm* — Jianq Chyun IP Office (57) ABSTRACT

A method for audio/video synchronization and an apparatus thereof are provided. At least one dynamic synchronization checkpoint is disposed on the playback sample number axis of a video. Whether or not the audio and the video are synchronized is checked when the playback sample number of the video is set the dynamic synchronization checkpoint. The video is paused playing if the playback speed of the video is too fast, and those delayed playback sample number of the video having not been played are skipped if the playback speed of the video is too slow. Furthermore, the location of the dynamic synchronization checkpoint and the frequency of performing synchronization detection are adjusted according to the playback time jitter between the audio and the video.

15 Claims, 4 Drawing Sheets

METHOD AND APPARATUS FOR AUDIO/VIDEO SYNCHRONIZATION

CROSS-REFERENCE TO RELATED APPLICATION

This application claims the priority benefit of Taiwan application serial no. 95147910, filed on Dec. 20, 2006. All disclosure of the Taiwan application is incorporated herein by reference.

BACKGROUND OF THE INVENTION

1. Field of the Invention

The present invention relates to a synchronization method and an apparatus thereof. More particularly, the present invention relates to a method for synchronizing an audio and a video.

2. Description of Related Art

With existing Internet applications, a user can attend a real-time video conference with people from various locations by using only a computer and a network, which saves the user a lot of time. During a video conference, a sending end transmits a video stream and an audio stream independently to a receiving end via the network due to different characteristics of video signal and audio signal. Because video samples and audio samples are sent separately and independently, a playback time difference between a video sample and its corresponding audio samples may be produced while the machine at the receiving end receives and plays the video and the audio. To eliminate the playback time difference, the synchronization between video samples and corresponding audio samples has to be checked timely and the playback times of video samples and corresponding audio samples have to be adjusted appropriately.

Generally speaking, machines at various ends synchronize the playback times of video samples and audio samples according to the absolute time provided by the network time protocol. However, such method becomes invalid if a machine at one end cannot use the network time protocol. According to another method for audio/video synchronization, the machines at various ends adjust the playback times of video samples and audio samples on the basis of a virtual time axis respectively. However, the algorithm for maintaining such virtual time axis is very complex and may affect the service quality of the video conference. Besides, even though the time axes referred by different machines are synchronized, the clock speeds of the machines may be different to affect the service quality of the video conference. Moreover, the potential problem of clock skew may cause errors to the playback times calculated by various machines.

A method for calculating the number of audio samples corresponding to a video sample by using the sampling frequency of the audio and the playback speed of the video is disclosed in U.S. Pat. No. 5,351,092. If the calculated audio sample number is not an integer, a closest number greater than the audio sample number is used as the audio playback sample number. Too many audio samples may be played at an audio/video synchronization point, thus, the audio has to be paused until the next video sample is played.

A method for obtaining the playback status of an audio and a video by comparing presentation time stamps (PTS) in the audio data and the video data and a system time of the machine is disclosed in U.S. Pat. No. 5,617,502. If the audio or the video is ahead of the other, the audio sample or the video sample is paused playing. If the audio or the video is delayed, those delayed audio sample or video samples having not been played are skipped. This patent is applicable to those platforms based on moving picture experts group (MPEG) system.

According to methods disclosed in U.S. Pat. No. 6,130,987 and U.S. Pat. No. 7,054,544, a reference time is calculated by using the sampling frequency of an audio and audio sample number having been played, and expected video sample number to be played is calculated by using the reference time, wherein the expected video sample number to be played and the video sample number having been played are compared and appropriately adjusted accordingly.

A method for supplying a synchronization information produced while the process of playing audio samples to a video playback apparatus so that the apparatus can determine whether or not the audio and the video are synchronized is disclosed in U.S. Pat. No. 6,452,974, in which the synchronization information may be audio sample number having been played and the time period from the beginning of playing audio samples to present.

According to the method disclosed in U.S. Pat. No. 6,510,279, an audio time stamp is calculated by using sampling frequency of an audio and audio sample number having been played, and the time stamps of the audio and the video are compared at fixed time points, in which the video sample is paused playing if the time stamp of the video is greater than the time stamp of the audio, otherwise those delayed video samples having not been played are skipped.

SUMMARY OF THE INVENTION

Accordingly, the present invention is directed to an audio/video synchronization method and an apparatus thereof. In the invention, at least one dynamic synchronization checkpoint is disposed on a playback sample number axis of the video signal for performing audio/video synchronization detection, and the video signal is adjusted to be synchronized to the audio signal.

The present invention provides an audio/video synchronization method. A video signal and an audio signal are received from a receiving end, and at least one dynamic synchronization checkpoint is disposed on a playback sample number axis of the video signal. Whether or not the audio signal and the video signal are synchronized is detected at each dynamic synchronization checkpoint. The video signal is adjusted when the audio signal and the video signal are not synchronized.

The present invention provides an audio/video synchronization apparatus including a mute detector, an audio sample number error limit generator, a dynamic synchronization checkpoint generator, an audio sample number expected value generator, an audio/video synchronization regulator, a dynamic adjustment parameter generator, and a video synchronization buffer. The mute detector receives an audio signal and determines whether or not to insert a mute data into the audio signal. The audio sample number error limit generator receives the audio signal and generates an upper error limit and a lower error limit. The dynamic synchronization checkpoint generator receives a video signal and generates at least one dynamic synchronization checkpoint on the playback sample number axis of a video signal according to a dynamic adjustment parameter. The audio sample number expected value generator receives the audio signal and generates an expected value of playback sample number of the audio signal according to the dynamic adjustment parameter. The audio/video synchronization regulator receives the audio signal and the video signal, and generates a difference between the expected value and an actual value of playback sample number of the audio signal and a control signal to the video synchronization buffer according to the actual value, the expected value, the upper error limit, and the lower error limit. The dynamic adjustment parameter generator is coupled to the audio/video synchronization regulator, and generates the dynamic adjustment parameter according to the difference provided by the audio/video synchronization regulator. The video synchronization buffer receives the video signal and outputs the correct playback sample number of the video signal to the video driver according to the control signal provided by the audio/video synchronization regulator.

BRIEF DESCRIPTION OF THE DRAWINGS

The included drawings provide a further understanding of the invention, and are incorporated in and constitute a part of this specification. The drawings illustrate exemplary embodiments of the invention and, together with the description, explain the principles of the invention.

DESCRIPTION OF EMBODIMENTS

For the convenience of description, the present exemplary embodiment is assumed to be applied in video conference; however, the present invention is also applicable to other fields such as internet protocol (IP) video phone. When a video stream and a voice stream are played together, the two are related in terms of playback time, for example, the shape of mouth has to match the played words. According to some researches, the tolerable playback time difference between video and audio is ±80 ms, which means, a person is not able to distinguish a playback time error between a video and an audio within such a range.

The present invention provides an audio/video synchronization method including at least following steps. A video signal and an audio signal are received from a receiving end, and at least one dynamic synchronization checkpoint is disposed on a playback sample number axis of the video signal. Whether or not the audio signal and the video signal are synchronized is detected at each dynamic synchronization checkpoint. The video signal is adjusted when the audio signal and the video signal are not synchronized.

According to the audio/video synchronization method in an exemplary embodiment of the present invention, the step of disposing at least one dynamic synchronization checkpoint on the playback sample number axis of the video signal further includes producing at least one dynamic synchronization checkpoint according to the playback speed of the video signal, the sampling frequency of the audio signal, and a dynamic adjustment parameter.

According to the audio/video synchronization method in an exemplary embodiment of the present invention, the step of detecting whether or not the audio signal and the video signal are synchronized at each dynamic synchronization checkpoint further includes following steps. An expected value of playback sample number of the audio signal is calculated at the dynamic synchronization checkpoint, an actual value of playback sample number of the audio signal is detected at the dynamic synchronization checkpoint, and a difference between the expected value and the actual value is calculated. The audio signal and the video signal are synchronized if the difference is between an upper error limit and a lower error limit. The audio signal and the video signal are not synchronized when the difference is greater than the upper error limit. The audio signal and the video signal are not synchronized when the difference is smaller than the lower error limit.

According to the audio/video synchronization method in an exemplary embodiment of the present invention, the step of adjusting the video signal when the audio signal and the video signal are not synchronized further includes following steps. The video signal is paused playing when the difference is greater than the upper error limit until the actual value of playback sample number of the audio signal is equal to the expected value. When the difference is smaller than the lower error limit, a closest synchronization point between the video signal and the audio signal is calculated by using the actual value of playback sample number of the audio signal, and the video signal is adjusted to play the playback sample number thereof corresponding to the synchronization point when the actual value of playback sample number of the audio signal is equal to the playback sample number of the audio signal corresponding to the synchronization point.

According to an exemplary embodiment of the present invention, the audio/video synchronization method further includes detecting the intensity of the audio signal in order to determine whether or not the sending end needs to transmit the audio signal to the receiving end. When the sending end determines not to transmit the audio signal, the receiving end plays mute in order to accumulate the playback sample number of the audio signal.

According to an exemplary embodiment of the present invention, the audio/video synchronization method further includes detecting whether or not the audio signal received by the receiving end is lost. When the audio signal is lost, the receiving end plays mute in order to accumulate the playback sample number of the audio signal.

The present invention provides an audio/video synchronization apparatus including a mute detector, an audio sample number error limit generator, a dynamic synchronization checkpoint generator, an audio sample number expected value generator, an audio/video synchronization regulator, a dynamic adjustment parameter generator, and a video synchronization buffer. The mute detector receives an audio signal and determines whether or not to insert a mute data into the audio signal. The audio sample number error limit generator receives the audio signal and produces an upper error limit and a lower error limit. The dynamic synchronization checkpoint generator receives a video signal and generates at least one dynamic synchronization checkpoint on a playback sample number axis of the video signal according to a dynamic adjustment parameter. The audio sample number expected value generator receives the audio signal and generates an expected value of playback sample number of the audio signal according to the dynamic adjustment parameter.

The audio/video synchronization regulator receives the audio signal and the video signal, and generates a difference between the expected value and an actual value of playback sample number of the audio signal and a control signal to the video synchronization buffer according to the actual value, the expected value, the upper error limit and the lower error limit of playback sample number of the audio signal. The dynamic adjustment parameter generator is coupled to the audio/video synchronization regulator, and generates the dynamic adjustment parameter according to the difference provided by the audio/video synchronization regulator. The video synchronization buffer receives the video signal and outputs the correct playback sample number of the video signal to the video driver according to the control signal provided by the audio/video synchronization regulator.

According to the audio/video synchronization apparatus in an exemplary embodiment of the present invention, the audio sample number error limit generator produces the upper error limit and the lower error limit according to the sampling frequency of the audio signal and a tolerable error range of human audition.

According to the audio/video synchronization apparatus in an exemplary embodiment of the present invention, the audio sample number expected value generator produces the expected value of playback sample number of the audio signal according to the sampling frequency of the audio signal, the playback speed of the video signal, and the dynamic adjustment parameter.

According to the audio/video synchronization apparatus in an exemplary embodiment of the present invention, the dynamic synchronization checkpoint generator generates each dynamic synchronization checkpoint according to the sampling frequency of the audio signal, the playback speed of the video signal, and the dynamic adjustment parameter.

According to the audio/video synchronization apparatus in an exemplary embodiment of the present invention, the audio/video synchronization regulator calculates the difference between the expected value and the actual value of the playback sample number of the audio signal at each dynamic synchronization checkpoint. The audio/video synchronization regulator outputs the control signal for controlling the video synchronization buffer to output the video signal normally when the difference is between the upper error limit and the lower error limit. The audio/video synchronization regulator outputs the control signal for controlling the video synchronization buffer to pause playing the video signal when the difference is greater than the upper error limit until the actual value is equal to the expected value of the playback sample number of the audio signal. When the difference is smaller than the lower error limit, the audio/video synchronization regulator calculates the closest synchronization point of the video signal and the audio signal by using the actual value of playback sample number of the audio signal, and the audio/video synchronization regulator outputs the control signal for controlling the video synchronization buffer to output the playback sample number of the video signal corresponding to the closet synchronization point when the actual value of playback sample number of the audio signal is equal to the playback sample number of the audio signal corresponding to the closet synchronization point.

According to the present invention, at least one dynamic synchronization checkpoint is disposed on the playback sample number axis of a video signal, and whether or not the video signal and an audio signal are synchronized is detected at each dynamic synchronization checkpoint so as to timely adjust the video signal to make it synchronized to the audio signal. Moreover, the locations of the dynamic synchronization checkpoints and the number of synchronization detections are adjusted according to the playback time jitter between the video signal and the audio signal, wherein the number of synchronization detections is increased along with the increment of playback time jitter between the audio signal and the video signal. Furthermore, whether or not the sending end transmits the audio signal and whether or not the audio signal is lost are detected while the process of playing the video signal and the audio signal. If the sending end does not transmit the audio signal or the audio signal is lost, the receiving end accumulates playback sample number of the audio signal by playing mute so that audio/video synchronization detections can be performed constantly without any error.

An exemplary Embodiment of the present invention will be described below.

Figure 1A:
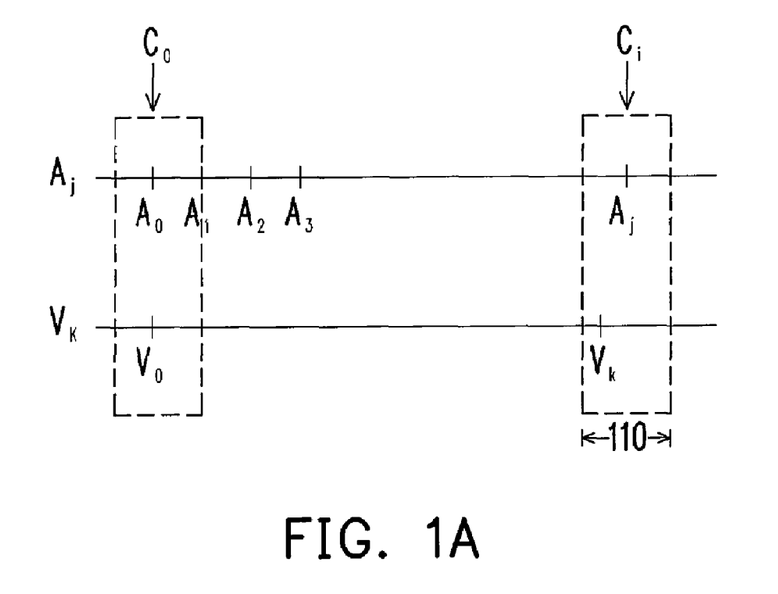
FIG. 1A is a diagram illustrating a synchronization state of a video and an audio.
Figure 1B:
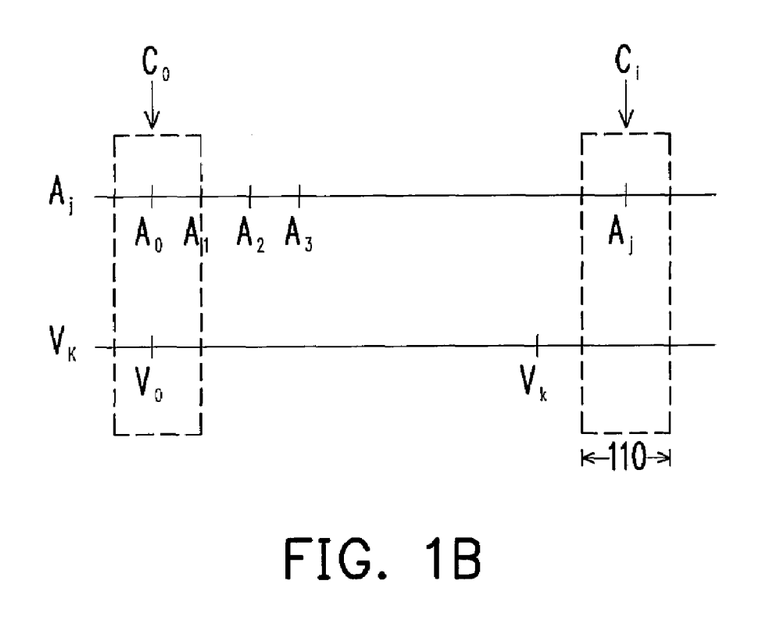
FIG. 1B is a diagram illustrating a synchronization state of a video and an audio.

FIGS. 1A and 1B are diagrams illustrating synchronization states of a video and an audio. Referring to FIG. 1A, an audio/video synchronization detection is performed at a synchronization checkpoint $C_0$, and here the video sample $V_0$ and the audio sample $A_0$ are synchronized since generally the two are played at the same time from the beginning. After some time, the audio/video synchronization detection is performed at a synchronization checkpoint $C_i$, and here the video sample $V_k$ has to be synchronized to the audio sample $A_j$. Since the playback time error between the video sample $V_k$ and the audio sample $A_j$ is within an error range 110, the video sample $V_k$ and the audio sample $A_j$ can still be considered as synchronized here, wherein the error range 110 is usually calculated based on errors tolerable to human audition, for example, ±80 ms. Referring to FIG. 1B, the audio/video synchronization detection is performed at the synchronization checkpoint $C_0$, and here the video sample $V_0$ and the audio sample $A_0$ are synchronized since generally the two are played at the same time from the beginning. After some time, the audio/video synchronization detection is performed at the synchronization checkpoint $C_i$, and here the video sample $V_k$ has to be synchronized to the audio sample $A_j$. Since the playback time error between the video sample $V_k$ and the audio sample $A_j$ is out of the error range 110, the video sample $V_k$ and the audio sample $A_j$ are not synchronized here.

It is assumed that the tolerable playback time error between the video and the audio is $\pm T_{sync}$ (seconds), the playback speed of the video is $R_v$ (sample number/second), and the sampling frequency of the audio is $R_a$ (sample number/second). In the present exemplary embodiment, at least one dynamic synchronization checkpoint is disposed on a playback sample number axis of the video, and the audio/video synchronization detection is performed at the dynamic synchronization checkpoint when the playback sample number of the video is set the dynamic synchronization checkpoint, wherein the locations of the dynamic synchronization checkpoints $C_1 \ldots C_i$ are adjusted according to a playback time jitter between the video and the audio on the playback sample number axis of the video, and the playback time jitter changes along with the playback time error between the video and the audio while every time performing the audio/video synchronization detection. The number of audio/video synchronization detections is increased if the jitter is large (the audio/video playback time error is large); otherwise, when the jitter is small (the audio/video playback time error is smaller), which means the playback times of the video and the audio are stable, the number of audio/video synchronization detections is reduced. Initially the synchronization checkpoint $C_0=0$, which means the audio/video synchronization detection is performed here to check whether or not the video playback sample 0 and the audio playback sample 0 are played synchronously. If a playback sample number of the video is set the dynamic synchronization checkpoint $C_i$, the audio/video synchronization detection is performed again at this playback sample number of the video.

Here the audio/video synchronization detection is to calculate a difference $D_i$ between an expected value $E_i$ of playback sample number of the audio (the audio sample number expected to be played) and an actual value $S_{ai}$ of playback sample number of the audio (the playback sample number having been played currently), wherein the difference $D_i=E_i-S_{ai}$. The video and the audio are considered synchronized if the difference $D_i$ is between an upper error limit $T_{sync} \times R_a$ and a lower error limit $-T_{sync} \times R_a$. Contrarily, if the difference $D_i$ is smaller than the lower error limit $-T_{sync} \times R_a$, which means the playback speed of the video is too slow, an audio sample number n and a video sample number m corresponding to a closest synchronization point of the audio and the video are calculated by using the actual value $S_{ai}$ of playback sample number of the audio. When the actual value $S_{ai}$ of playback sample number of the audio is equal to n, the video is played forward to the playback sample number m thereof and is played continuously from there, so that those delayed video samples having not been played are skipped. If the difference $D_i$ is greater than the upper error limit $T_{sync} \times R_a$, which means the playback speed of the video is too fast, the video has to be paused playing until the actual value $S_{ai}$ of playback sample number of the audio is equal to the expected value $E_i$ of playback sample number of the audio.

Figure 2:
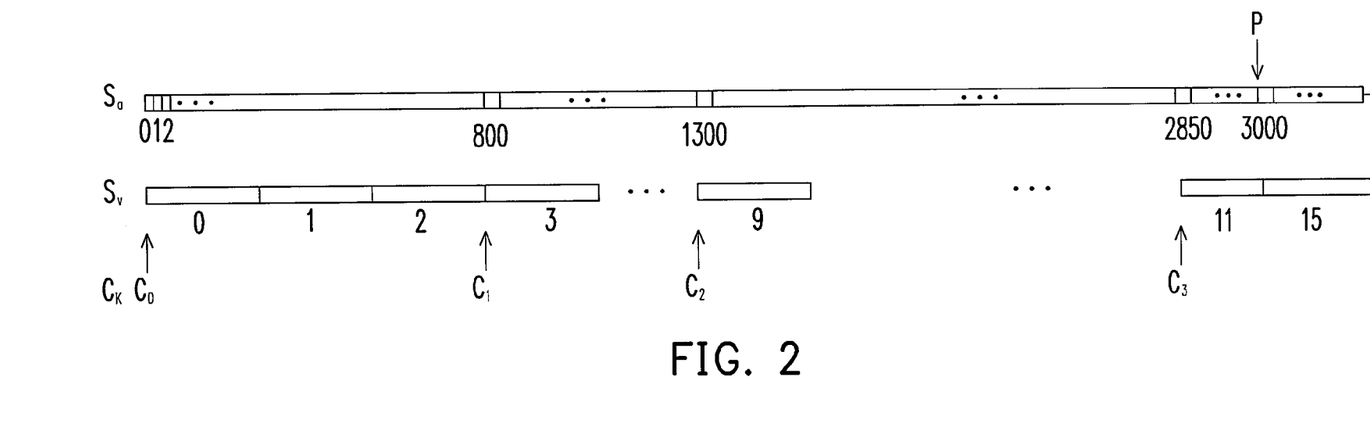
FIG. 2 is a diagram illustrating a synchronization state of a video sample number and a video sample number.

In following description, it is assumed that the playback speed of the video is 30 samples(images)/second, the sampling frequency of the audio is 6000 Hz, and the tolerable playback time error between the video and the audio is 180 ms, wherein the upper error limit is 0.08×6000=480, and the lower error limit is −0.08×6000=−480. It can be understood from foregoing assumption that every video playback sample has to be synchronized to every 200 audio playback samples. FIG. 2 is a diagram illustrating a synchronization state of an audio sample number and a video sample number, wherein $S_a$ is audio playback sample number, $S_v$ is video playback sample number, and $C_k$ is the location of each dynamic synchronization checkpoint. Referring to FIG. 2, the initial dynamic synchronization checkpoint $C_0=0$, and here the video playback sample 0 and the audio playback sample 0 are played together, thus, the video and the audio are synchronized. It is assumed here that the next dynamic synchronization checkpoint $C_1=3$, which means an audio/video synchronization detection is performed at the video playback sample 3.

The expected value $E_1$ of the audio playback sample number is 600 at the video playback sample 3, as shown in FIG. 2, here the actual value $S_{a1}$ of the audio playback sample number is 800. Since the difference ($D_1=-200$) between the expected value and the actual value of the audio playback sample number is between the upper error limit and the lower error limit ($-480 \leq D_1 \leq 480$), the video and the audio are considered synchronized here and it is not necessary to adjust the playback state of the video. In the present exemplary embodiment, the variation of the differences between the expected values and the actual values of the audio playback sample number is calculated while every time an audio/video synchronization detection is performed in order to obtain the playback time jitter between the video and the audio, and the location of the dynamic synchronization checkpoint and the frequency for performing audio/video synchronization detection are adjusted according to the playback time jitter between the video and the audio (described below).

It is assumed here that the next dynamic synchronization checkpoint $C_2=9$ is obtained according to the playback time jitter between the video and the audio, which means an audio/video synchronization detection is performed at the video playback sample 9. The expected value $E_1$ of the audio playback sample number is 1800 at the video playback sample 9, and as shown in FIG. 2, here the actual value $S_{a2}$ of the audio playback sample number is 1300. Since the difference ($D_2=500$) between the expected value and the actual value of the audio playback sample number is greater than the upper error limit, which means the playback speed of the video is too fast, here the video has to be paused playing until the actual value $S_{a2}$ is equal to the expected value $E_2$ of the audio playback sample number, so as to synchronize the audio and the video.

It is assumed here that the next dynamic synchronization checkpoint $C_3=11$ is obtained according to the playback time jitter between the video and the audio, which means an audio/video synchronization detection is performed at the video playback sample number 11. The expected value $E_3$ of the audio playback sample number is 2200 at the video playback sample 11, and as shown in FIG. 2, here the actual value $S_{a3}$ of the audio playback sample number is 2850. Since the difference ($D_3=-650$) between the expected value and the actual value of the audio playback sample number is smaller than the lower error limit, which means the playback speed of the video is too slow, a closest audio/video synchronization point P is calculated by using the actual value $S_{a3}=2850$ of the audio playback sample number, and here the audio playback sample number and the video playback sample number corresponding to the synchronization point P are respectively 3000 and 15. The video playback sample 15 is directly played forward when the actual value of the audio playback sample number is 3000, namely, the delayed video samples 12, 13, and 14 are skipped.

Next, the method for disposing dynamic synchronization checkpoints on the video playback sample number axis is described in detail below. The locations of the dynamic synchronization checkpoints are $C_0=0$ and $C_{i+1}=C_i+K_i \times R_v/GCD(R_v, R_a)$, wherein $GCD(R_v, R_a)$ is the greatest common divisor of the playback speed $R_v$ of the video and the sampling frequency $R_a$ of the audio, and $K_i$ is a dynamic adjustment parameter generated according to the playback time jitter between the video and the audio. The audio/video synchronization detection has to be performed more times if the playback time jitter between the video and the audio is large, and at most, the audio/video synchronization detection is performed to each video sample.

The playback time jitter between the video and the audio can be obtained from the variation of the difference $D_i$ between the expected value $E_i$ and the actual value $S_{ai}$ of the audio playback sample number, wherein the variation $J_i=|D_i-D_{i-1}|$. The dynamic adjustment parameter $K_i=|GCD(R_v, R_a)/(\overline{J}_i+1)|$, wherein $\overline{J}_i$ is an average of the variation ($\overline{J}_i=\alpha J_i+(1-\alpha)\overline{J}_{i-1}$, α is a predetermined coefficient). In addition, the expected value $E_0$ of the audio playback sample number is 0 and $E_{i+1}=E_i+K_i \times R_a/GCD(R_v, R_a)$).

Figure 3A:
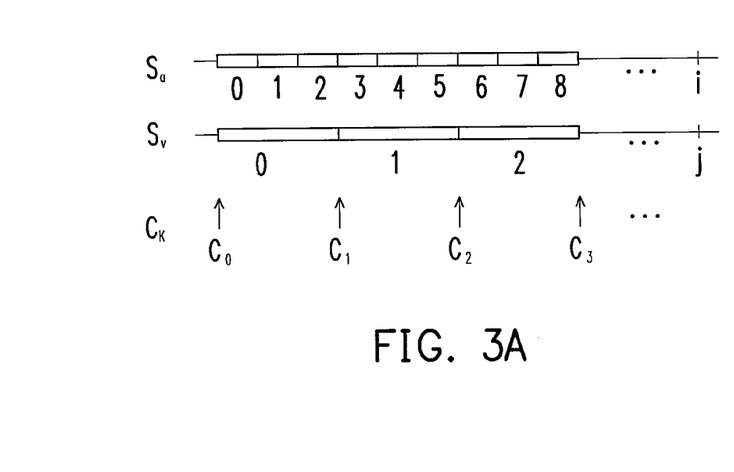
FIG. 3A illustrates the locations of dynamic synchronization checkpoints produced according to a playback time jitter between a video and an audio.
Figure 3B:
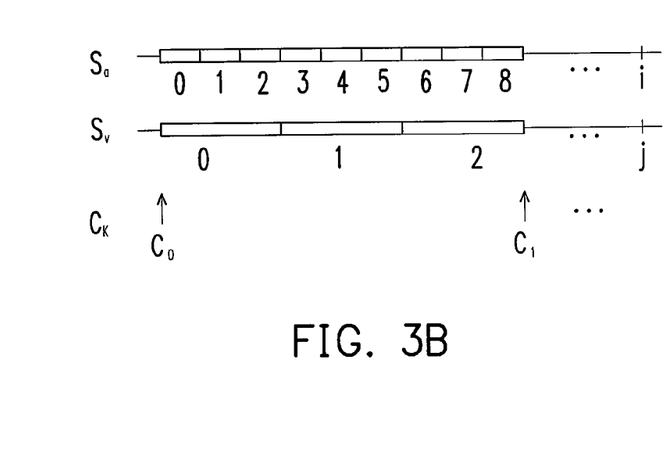
FIG. 3B illustrates the locations of dynamic synchronization checkpoints produced according to a playback time jitter between a video and an audio.

FIGS. 3A and 3B illustrate the locations of dynamic synchronization checkpoints generated according to a playback time jitter between a video and an audio, wherein $S_a$ is the audio playback sample number, $S_v$ is the video playback sample number, and $C_k$ is the location of each dynamic synchronization checkpoint. Referring to FIG. 3A, the dynamic adjustment parameter $K_i$ reduces the distance between two adjacent dynamic synchronization checkpoints when the playback time jitter between the video and the audio is large, which means, the frequency of performing audio/video synchronization detection is increased, and at most, the audio/video synchronization detection is performed to every video sample. Referring to FIG. 3B, the dynamic adjustment parameter $K_i$ increases the distance between two adjacent dynamic synchronization checkpoints when the playback time jitter between the video and the audio is small, so as to reduce the frequency of performing audio/video synchronization detection.

Figure 4:
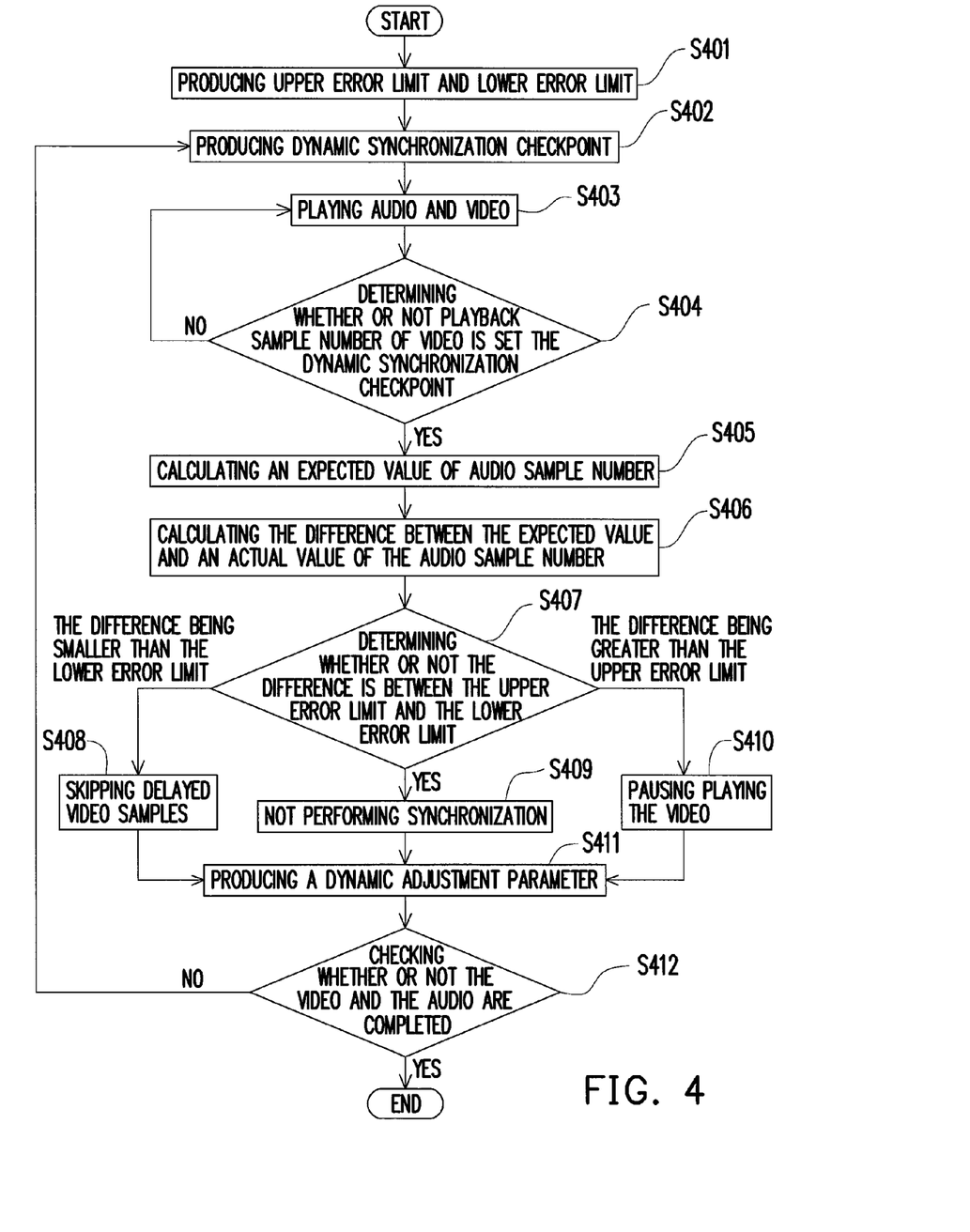
FIG. 4 is a flowchart illustrating an audio/video synchronization method according to an exemplary embodiment of the present invention.

FIG. 4 is a flowchart illustrating an audio/video synchronization method according to an exemplary embodiment of the present invention. Referring to FIG. 4, An upper error limit and a lower error limit are produced according to a tolerable playback time error range and the sampling frequency of the audio in step S401. Dynamic synchronization checkpoints are produced on the playback sample number axis of the video in step S402, and the video and the audio are played in step S403. In step S404, whether or not the playback sample number of the video is equal to the dynamic synchronization checkpoint. If so, the audio/video synchronization detection is performed, otherwise, the video and audio are played continuously in step S403. As in step S405, the audio/video synchronization detection is to calculate an expected value of the playback sample number of the audio. A difference between the expected value and an actual value of the playback sample number of the audio is calculated in step S406, and whether or not the difference is between an upper error limit and a lower error limit is determined in step S407.

If the difference is between the upper error limit and the lower error limit, which means the video and the audio are synchronized, the video is not to be adjusted (step S408) and step S411 is performed. If the difference is smaller than the lower error limit, which means the playback speed of the video is too slow, those delayed video samples having not been played are skipped as in step S409, and step S411 is performed. If the difference is greater than the upper error limit, which means the playback speed of the video is too fast, the video is paused playing in step S410 until the actual value of the audio playback sample number is equal to the expected value of the audio playback sample number. After that the video is resumed in step S410 and step S411 is performed.

In step S411, the dynamic adjustment parameter is produced according to the playback time jitter between the video and the audio, namely, the variation of the difference between the expected value and the actual value of the audio playback sample number, and the average of the variation. After that, whether or not the video and the audio are finished is detected in step S412. If the video and the audio have not finished, step S402 is performed to produce dynamic synchronization checkpoints on the playback sample number axis of the video continuously.

Figure 5:
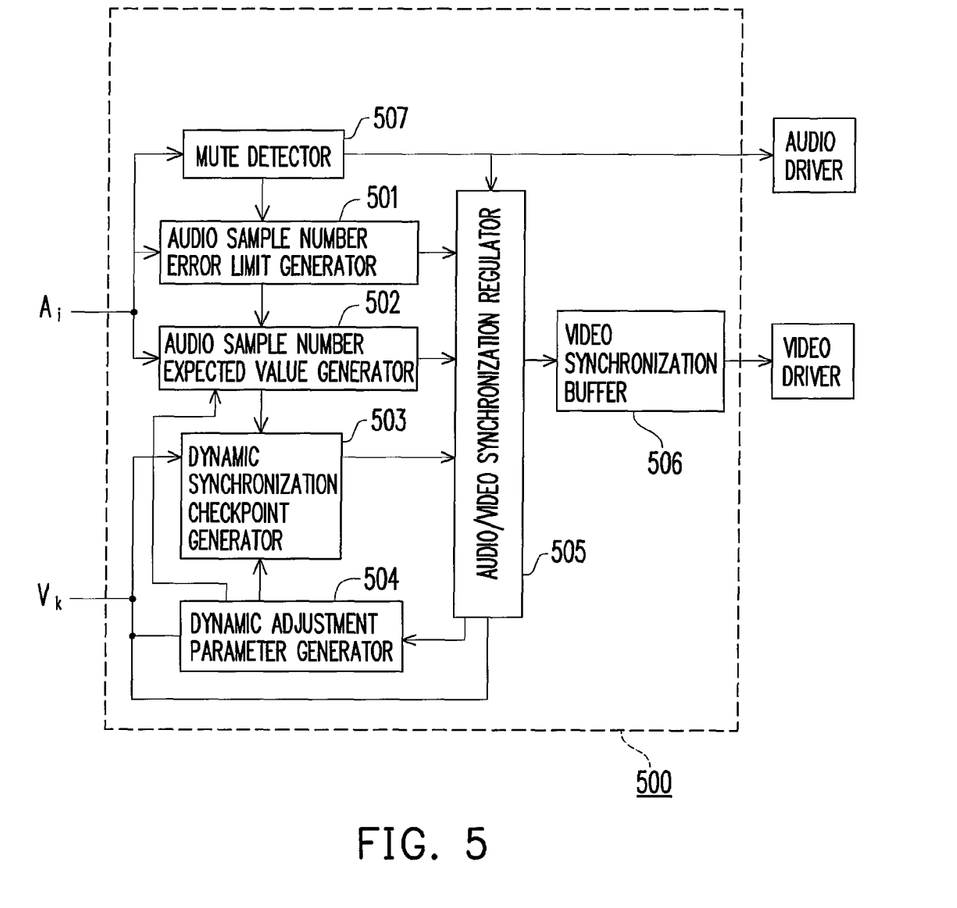
FIG. 5 is a block diagram of an audio/video synchronization apparatus according to an exemplary embodiment of the present invention.

FIG. 5 is a block diagram of an audio/video synchronization apparatus according to an exemplary embodiment of the present invention. Referring to FIG. 5, the audio/video synchronization apparatus 500 includes an audio sample number error limit generator 501, an audio sample number expected value generator 502, a dynamic synchronization checkpoint generator 503, a dynamic adjustment parameter generator 504, an audio/video synchronization regulator 505, a video synchronization buffer 506, and a mute detector 507. The audio sample number error limit generator 501 receives an audio signal $A_i$ and produces an upper error limit and a lower error limit according to a tolerable playback time error between a video signal $V_k$ and the audio signal $A_i$, and the sampling frequency of the audio signal $A_i$, and the audio sample number error limit generator 501 provides the upper error limit and the lower error limit to the audio/video synchronization regulator 505.

The audio sample number expected value generator 502 receives the audio signal $A_i$ and produces an expected value of playback sample number of the audio according to the sampling frequency of the audio signal $A_i$ and a dynamic adjustment parameter, and the audio sample number expected value generator 502 provides the expected value to the audio/video synchronization regulator 505. The dynamic synchronization checkpoint generator 503 receives the video signal $V_k$ and generates a plurality of dynamic synchronization checkpoints on a playback sample number axis of the video signal $V_k$ according to the playback speed of the video signal $V_k$ and the dynamic adjustment parameter. The audio/video synchronization regulator 505 receives the video signal $V_k$ and the audio signal $A_i$, and determines whether or not the video signal $V_k$ and the audio signal $A_i$ are synchronized according to the difference between the expected value and the actual value of the audio playback sample number.

If the difference is between the upper error limit and the lower error limit, which means the video signal $V_k$ and the audio signal $A_i$ are considered synchronized, it is not necessary to adjust the video signal $V_k$. If the difference is greater than the upper error limit, which means the playback speed of the video signal is too fast, the audio/video synchronization regulator 505 outputs a control signal for controlling the video synchronization buffer 506 to pause the video signal $V_k$ until the actual value of the playback sample number of the audio is equal to the expected value thereof. If the difference is smaller than the lower error limit, which means the playback speed of the video signal $V_k$ is too slow, the audio/video synchronization regulator 505 calculates an audio playback sample number n and a video playback sample number m corresponding to a closest synchronization point of the video and the audio by using the actual value of the audio playback sample number. When the actual value of the audio playback sample number is equal to n, the audio/video synchronization regulator 505 outputs a control signal for controlling the video synchronization buffer 506 to play forward the video playback sample number m, namely, those delayed video samples having not been played are skipped.

The mute detector 507 detects whether or not the sending end transmits the audio signal $A_i$ to the receiving end, and detects whether or not the audio signal $A_i$ received by the receiving end is lost. If the sending end does not transmit the audio signal $A_i$ or the audio signal $A_i$ received by the receiving end is lost, the mute detector 507 provides a mute playback sample so that the receiving end keeps accumulating the audio playback sample number by playing mute, and the audio/video synchronization apparatus 500 is prevented from producing errors.

It should be mentioned here that even though a possible pattern of the audio/video synchronization method and an apparatus thereof has been described in the exemplary embodiment described above, those having ordinary knowledge in the art should understand that there are various method for adjusting a video to make the video synchronized to an audio, thus, the application of the present invention should not be limited to the possible pattern described above. In other words, it is up to the spirit of the present invention as long as dynamic synchronization checkpoints are disposed on the playback sample number axis of a video and the frequency of audio/video synchronization detection is adjusted dynamically.

In summary, according to the present invention, at least one dynamic synchronization checkpoint is disposed on a video playback sample number axis for preventing the problem in conventional technique that the machines at both the receiving and the sending ends perform synchronization detection with reference to the same time axis and the problem of clock skew caused by different clock speeds of the machines at the receiving and the sending ends. Moreover, the frequency of performing synchronization detection is adjusted according to the playback time jitter between the video and the audio in order to comply with the present playback status of the video and the audio.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An audio/video synchronization method, comprising:
   receiving a video signal and an audio signal from a receiving end;
   setting at least one dynamic synchronization checkpoint according to the video signal on a playback sample number axis of the video signal;
   calculating an expected value of playback sample number of the audio signal at the dynamic synchronization checkpoint;
   detecting an actual value of playback sample number of the audio signal at the dynamic synchronization checkpoint; and
   calculating a difference between the expected value and the actual value;
   the audio signal and the video signal being synchronized when the difference is between an upper error limit and a lower error limit, and
   the audio signal and the video signal not being synchronized when the difference is greater than the upper error limit; and
   the audio signal and the video signal not being synchronized when the difference is smaller than the lower error limit; and
   adjusting the video signal when the audio signal and the video signal are not synchronized.

2. The audio/video synchronization method as claimed in claim 1, wherein the step of setting at least one dynamic synchronization checkpoint on the playback sample number axis of the video signal comprises:
   producing the dynamic synchronization checkpoint on the playback sample number axis of the video signal according to a playback speed of the video signal, a sampling frequency of the audio signal, and a dynamic adjustment parameter.

3. The audio/video synchronization method as claimed in claim 2 further comprising:
   calculating an expected value of playback sample number of the audio signal at the dynamic synchronization checkpoint;
   detecting an actual value of playback sample number of the audio signal at the dynamic synchronization checkpoint;
   calculating a variation of differences between the expected value and the actual value at the dynamic synchronization checkpoint and at a previous dynamic synchronization checkpoint; and
   producing the dynamic adjustment parameter according to the variation and an average of the variation.

4. The audio/video synchronization method as claimed in claim 1, wherein the step of adjusting the video signal when the audio signal and the video signal are not synchronized comprises:
   pausing playing the video signal when the difference is greater than the upper error limit until the actual value is equal to, the expected value; and
   calculating a closest synchronization point of the video signal and the audio signal by using the actual value when the difference is smaller than the lower error limit, and adjusting the video signal to be played a playback sample number of the video signal corresponding to the closest synchronization point when the actual value is equal to an playback sample number of the audio signal corresponding to the closest synchronization point.

5. The audio/video synchronization method as claimed in claim 1, wherein the upper error limit and the lower error limit are calculated according to the sampling frequency of the audio signal and a tolerable error range of human audition.

6. The audio/video synchronization method as claimed in claim 1 further comprising:
   detecting an intensity of the audio signal, determining whether or not a sending end needs to transmit the audio signal to the receiving end; and
   playing mute at the receiving end to keep accumulating playback sample number of the audio signal when the sending end determines not to transmit the audio signal.

7. The audio/video synchronization method as claimed in claim 1 further comprising:
   detecting whether or not the audio signal received by the receiving end is lost; and
   inserting a mute data in the receiving end to accumulate playback sample number of the audio signal if the audio signal is lost.

8. An audio/video synchronization apparatus, comprising:
   an audio sample number error limit generator, receiving an audio signal, and producing an upper error limit and a lower error limit;
   a dynamic synchronization checkpoint generator, receiving a video signal, and producing at least one dynamic synchronization checkpoint on a playback sample number axis of the video signal according to a dynamic adjustment parameter;
   an audio sample number expected value generator, receiving the audio signal, and generating an expected value of playback sample number of the audio signal according to the dynamic adjustment parameter;
   an audio/video synchronization regulator, receiving the audio signal and the video signal, and generating a difference between the expected value and an actual value of playback sample number of the audio signal and a control signal according to the actual value, the expected value, the upper error limit, and the lower error limit;
   a dynamic adjustment parameter generator, coupled to the audio/video synchronization regulator, and producing the dynamic adjustment parameter according to the difference provided by the audio/video synchronization regulator; and
   a video synchronization buffer, receiving the video signal, and outputting a playback sample number of the video signal according to the control signal provided by the audio/video synchronization regulator.

9. The audio/video synchronization apparatus as claimed in claim 8, wherein the audio sample number error limit generator comprises:

generating the upper error limit and the lower error limit according to a sampling frequency of the audio signal and a tolerable error range of human audition.

10. The audio/video synchronization apparatus as claimed in claim 8, wherein the audio sample number expected value generator comprises:
   producing the expected value of playback sample number of the audio signal according to the sampling frequency of the audio signal, a playback speed of the video signal, and the dynamic adjustment parameter.

11. The audio/video synchronization apparatus as claimed in claim 8, wherein the dynamic synchronization checkpoint generator comprises:
   producing the dynamic synchronization checkpoint according to the sampling frequency of the audio signal, the playback speed of the video signal, and the dynamic adjustment parameter.

12. The audio/video synchronization apparatus as claimed in claim 8, wherein the audio/video synchronization regulator comprises:
   calculating the difference between the expected value and the actual value at the dynamic synchronization checkpoint;
   outputting the control signal for controlling the video synchronization buffer to output the video signal normally when the difference is between the upper error limit and the lower error limit;
   outputting the control signal for controlling the video synchronization buffer to pause playing the video signal when the difference is greater than the upper error limit until the actual value is equal to the expected value; and
   calculating a closest synchronization point of the video signal and the audio signal by using the actual value when the difference is smaller than the lower error limit, and outputting the control signal for controlling the video synchronization buffer to output a playback sample number of the video signal corresponding to the closest synchronization point when the actual value is equal to a playback sample number of the audio signal corresponding to the closest synchronization point.

13. The audio/video synchronization apparatus as claimed in claim 8, wherein the dynamic adjustment parameter generator calculates a variation of differences between the expected value and the actual value at the dynamic synchronization checkpoint and at a previous dynamic synchronization checkpoint, and generates the dynamic adjustment parameter according to an average of the variation.

14. The audio/video synchronization apparatus as claimed in claim 8 further comprising:
   a mute detector, detecting whether or not a sending end transmits the audio signal, and providing a plurality of mute samples to the audio/video synchronization regulator.

15. The audio/video synchronization apparatus as claimed in claim 8 further comprising:
   a mute detector, detecting whether or not the audio signal is lost, and providing a plurality of mute samples to the audio/video synchronization regulator.

* * * * *